Patented Jan. 12, 1943

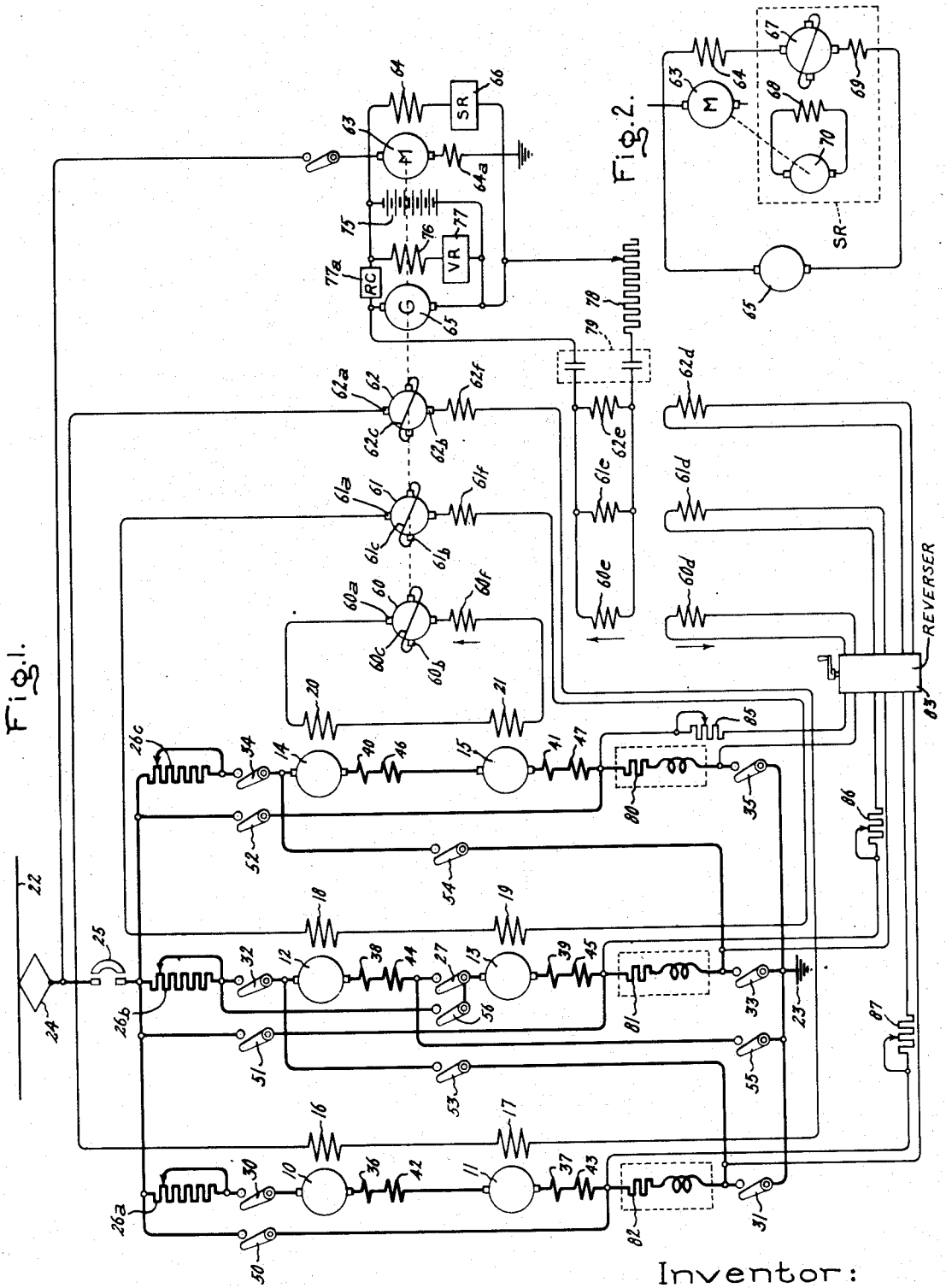

2,308,301

UNITED STATES PATENT OFFICE 2,308,301

CONTROL SYSTEM

Thomas F. Perkinson, Erie, Pa., assignor to General Electric Company, a corporation of New York Application December 24, 1941, Serial No. 424,321

9 Claims. (Cl. 172—179)

My invention relates to electric motor control systems and is particularly applicable to electric traction motor control systems for electrically driven vehicles, such as locomotives, trolley cars, trolley buses, and the like.

In traction applications of direct-current electric motors it is common practice to use series-wound motors. When such systems are to be used for regenerative braking it is necessary to excite the motor field exciting windings separately and to control their excitation so that smooth operation of the vehicle is obtained regardless of changes in supply line voltage and tractive effort requirement. Various methods of obtaining the required separate excitation and its control have been employed. In some systems special motor driven exciters are employed. Other systems may employ an axle driven exciting source, or one or more of the traction motors themselves may be employed to furnish exciting energy to the remaining traction motors. In general the exciting machines, their associated balancing resistors, and the control equipment employed to effect the required braking circuit arrangements must carry relatively large currents, so that the inclusion of regenerative braking necessitates relatively heavy, complicated and costly equipment.

In the accelerating operation of a series motor it is well known to provide means for shunting the field winding in one or a plurality of steps thereby to obtain higher vehicle speeds after the accelerating resistor is completely short circuited. While this system is suitable in many applications, it has the disadvantage that the field control operates in relatively large steps and permits only an equal number of widely separated vehicle speeds. My invention provides a practical means for continuous traction motor excitation field control at low voltage without the use of contactors or a variable resistor in the traction motor exciting field circuit itself.

Accordingly, it is an object of my invention to provide new and improved means for controlling the acceleration and electric braking of an electric motor.

It is a further object of my invention to provide simplified and improved electric motor control means which shall have great flexibility in both accelerating and electric braking operation.

It is a still further object of my invention to provide a simplified and continuous field control system for an electric motor which shall be operable in both accelerating and braking without change in field circuit connections.

It is a specific object of my invention to provide a low voltage and continuous field excitation control system for a separately excited electric motor which shall include a single control element for controlling the motor acceleration and both regenerative and dynamic braking without change of motor field circuit connections.

According to my invention I provide one or a plurality of traction motors with a variable accelerating and braking resistor connected in series circuit relation with the motor armature and with a separately excited field winding energized at low voltage from an armature reaction excited generator or dynamo-electric amplifier which is driven at substantially constant speed by a separate driving motor. In order to provide the traction motor or motors with a predominantly series operating characteristic during motoring operation I control the output current and voltage of the dynamo-electric amplifier by a main control field winding energized in accordance with the magnitude of current in the traction motor armature circuit. To provide manual control of the traction motor field windings I provide the armature reaction generator with a reference control field preferably connected to aid the current responsive field of the exciter in motoring operation. Preferably both control field windings are energized through variable resistors. The reference control field windings are connected to a substantially constant voltage direct current generator driven by a substantially constant speed motor.

The control system described above has numerous advantages which will be further appreciated as this description proceeds. For example, during motoring operation field strength control of the traction motors may be carried on in a continuous manner by manual resistance control of the low power reference field of the armature reaction exciter. Furthermore, change from motoring to regenerative braking operation may be accomplished by merely increasing the energization of the motor field winding to a slight degree. Thus, it is not necessary to change the connections of the traction motor field windings in shifting from motoring to regenerative braking operation. The braking can be changed from regenerative to dynamic at low speeds by simply short circuiting the motor armatures through the accelerating resistances or upon themselves. Since the motor fields are wound for low voltage current the traction motor should be lower in first cost and the maintenance cost should also be lower. While the advantages of separate field excitation are retained in that transfer contactors for shifting the field connections from motoring to braking and shunting or tapping contactors for field weakening are not required, the desirable speed-torque characteristics of the series motor are also procured by energizing the dynamo-electric amplifier in accordance with the traction motor current. Furthermore, due to the method of traction motor excitation and to the control employed, the conventional balancing resistors used in other regenerative braking systems are not required.

My invention itself will be better understood and its objects and advantages further appreciated by referring now to the following detailed specification taken in conjunction with the accompanying drawing in which Fig. 1 is a schematic circuit diagram of connections for a traction motor control system embodying my invention; and Fig. 2 is a fragmentary circuit diagram showing the details of connection of a portion of the circuit shown at Fig. 1.

Referring now to the drawing, and particularly to Fig. 1, I have shown a traction motor control system comprising a plurality of electric traction motors having armatures 10, 11, 12, 13, 14 and 15 and separately excited field windings 16, 17, 18, 19, 20 and 21, respectively. In the form of the invention illustrated in the drawing I have shown switching means for selectably connecting the armatures all in series, or in series groups of two with three groups in parallel, or in series groups of three with two groups in parallel, as will be more fully described hereinafter. The motor armatures are connected in the selected circuit relation between a high voltage source of direct current supply such as a line conductor 22 and a ground connection 23. High voltage current enters the motors through a movable trolley 24 and a line circuit breaker 25. Variable accelerating and braking resistors 26a, 26b and 26c are provided for the pairs of motor armatures 10 and 11, 12 and 13, and 14 and 15, respectively.

The pair of armatures 10 and 11 are permanently connected in series and the pair of armatures 14 and 15 are permanently connected in series. The pair of armatures 12 and 13 may be connected in series through a switch 27. The series circuit through the pair of traction motor armatures 10 and 11 also includes a pair of switches 30 and 31. Similarly, a series circuit through the traction motor armatures 12 and 13 includes a pair of switches 32 and 33, while the circuit through the armatures 14 and 15 includes a pair of switches 34 and 35. The traction motors are also provided with commutating field windings 36, 37, 38, 39, 40 and 41 and with pole face compensating windings 42, 43, 44, 45, 46 and 47, respectively.

In order to short circuit the traction motor armatures for dynamic braking operation I provide a switch 50 for connecting the armatures 10 and 11 and a loop circuit in series with the accelerating resistor 26a, a switch 51 for connecting the armatures 12 and 13 in a similar loop circuit with the resistor 26b, and a switch 52 for connecting the armatures 14 and 15 in a like manner to the resistor 26c.

The various circuit relations in which the traction motor armatures may be connected may be traced in the following manner: To connect the armatures 10 to 15 in three parallel connected pairs of series connected armatures the switches 30, 31, 32, 27, 33, 34 and 35 are closed. For connecting all the armatures in series circuit relation I have shown a switch 53 arranged to connect one side of the motor group 10, 11 to the other side of the motor group 12, 13 and a disconnecting switch 54 arranged to connect one side of the motor group 12, 13 to the other side of the motor group 14, 15. Thus, by opening the switches 31, 32, 33 and 34 and by closing the switches 30, 53, 27, 54 and 35, the six traction motor armatures may be connected all in series circuit relation. Similarly, I have shown a third group of disconnecting switches for connecting the traction motor armatures in two parallel connected groups of three series connected armatures each. To effect this connection, I provide a switch 55 connected from the ground connection 23 to the midpoint of the motor armature 12, 13 and a switch 56 shunting the motor armature 12 and the switches 32 and 27. Thus, by closing the switches 30, 53 and 55 to connect the armatures 10, 11 and 12 in series circuit relation with the accelerating and braking resistor 26a and by closing the switches 56, 54 to connect the motor armatures 13, 14 and 15 in series circuit relation with the accelerating and braking resistor 26b and the switches 55 and 35 to connect these series connected groups of three armatures in parallel circuit relation with each other the armatures will operate in a group of three series and two parallel, all the remaining switches being left open.

While I have shown my invention as applied to a group of six traction motors connectable in various series-parallel relationships, I wish to have it understood that the invention is not limited to the particular number of motors or to the particular series-parallel relationship disclosed but is applicable generally to any desired number of traction or other driving motors connected in any desired circuit relationships and is, in fact, equally applicable to a single driving motor.

As shown, the traction motor field windings 16 to 21, inclusive, are connected directly across the terminals of a plurality of direct current exciting generators 60, 61 and 62 of the type described and claimed in Patent 2,227,992, issued to Ernst F. W. Alexanderson and Martin A. Edwards on January 7, 1941. The exciters 60, 61 and 62 each have, respectively, a pair or set of current supply brushes designated as 60a, 61a and 62a and a second pair of brushes designated as 60b, 61b and 62b, respectively. The sets of brushes 60b, 61b and 62b are short circuited through conductors 60c, 61c and 62c, respectively, and are in quadrature relation with respect to the current supply brushes. The exciting generators 60, 61 and 62 are of the armature reaction excited type and are provided respectively with pairs of separately excited control field windings 60d and 60e, 61d and 61e, 62d and 62e. These separately excited field windings are arranged to set up a field flux in each exciting generator in such a direction as to generate a voltage between the short circuited brushes 60b, 61b and 62b, and the armature reaction of the current flowing through the short circuited connections 60c, 61c and 62c as a result of this voltage sets up a flux in such a direction as to provide an output voltage at the load brushes 60a, 61a and 62a. In order to neutralize the armature reaction of the load current taken off at the brushes 60a, 61a and 62a, the machines are provided with series connected compensating windings 60f, 61f and 62f, respectively. One of the desirable characteristics of an armature reaction excited generator of this type is that its output voltage responds very quickly and with a very high amplification factor to any change in the excitation of its separately excited field winding or windings. For this reason, machines of this type are frequently referred to as dynamo-electric amplifiers.

In the schematic diagram of Fig. 1 I have shown a separate armature reaction excited generator for supplying current in series circuit relation to the field windings of each series pair of traction motors when connected in the two series, three parallel circuit relation. I wish to have it understood that the invention is not limited to this particular manner of field excitation but that, if desired, all the traction motor field windings may be connected in series circuit relation and energized from a single dynamo-electric amplifier, or that a single amplifying exciter may be used to excite the traction motor field windings in various other combinations of series and parallel circuit relation. For example, when the motor armatures are connected in the two series, three parallel circuit relationship the motor field windings may likewise be connected across the terminals of a single exciter in the same relationship. When the traction motor armatures are connected in series-parallel circuit relation I consider the use of a separate exciting machine for each series-connected group of motors to be preferable. If all the fields were excited from a single machine in series-parallel relation, and if the driving wheels are not mechanically coupled, the slight differences which frequently occur in driving wheel diameters would give rise to circulating currents between the motor groups working in parallel circuit relation.

The direct current exciters 60, 61 and 62 are driven at a substantially constant speed by any suitable driving means, such as a direct current motor 63 energized from the trolley 24 and provided with a separately excited field winding 64 and a series field winding 64a. As shown in the drawing, the field winding 64 of the motor 63 is energized from a constant voltage direct current exciting generator 65 and is provided with a speed regulator 66 for maintaining constant the speed of the motor generator set comprising the machines 63 and 65. I wish to have it understood, however, that if desired, the motor 63 may be shunt excited from the trolley conductor 24.

At Fig. 2 I have shown a fragmentary diagram of the circuit of the driving motor 63 to illustrate the details of one suitable form of speed regulator. Referring to Fig. 2, the exciting winding 64 of the motor 63 is energized from the exciter 65 in series with a regulating voltage supplied by a small booster tachometer generator of the armature reaction excited type. The machine 67 is provided with a control field winding 68 and a load compensating field winding 69. In order to maintain constant the speed of the motor 63 the control field winding 68 for the armature reaction tachometer generator 67 is energized by the speed responsive voltage of a small auxiliary direct current exciter 70 driven directly from the motor 63. Due to the amplification characteristics of the armature reaction generator 67 any voltage change in the control winding 68 is magnified in the field circuit of the motor 63. Any increase in speed of the motor 63 and generator 65 will produce an increase in voltage at the exciter 70 and, as a result of the increased energization of the winding 68, will increase the voltage available at the load brushes of the dynamo-electric amplifier 67. Since the voltage of the machine 67 boosts that of the machine 65, an increased voltage of the machine 67 will increase the energization of the motor field winding 64 thereby to tend to return the speed of the motor 63 to normal.

To start the motor 63 and to cause the voltage of the generator 65 to build up in the proper direction, a battery 75 is connected in parallel to the generator 65. The generator 65 is energized by a shunt field winding 76 and is provided with a voltage regulator 77. The direct current exciting generator 65 charges the battery 75 and may also be used to energize low voltage control circuits arranged to actuate the various motor controlling contactors. Such circuits are well known in the art and have not been shown on the drawing. To prevent discharge of the battery 75 when its voltage is above that of the generator 65, a suitable reverse current relay 77a is included in the battery charging circuit.

The separately excited field windings 60e, 61e and 62e of the armature reaction excited generators 60, 61 and 62 are energized from the terminals of the constant voltage direct current exciter 65 in series with a controlling resistor 78 and a reversing switch 79. The control resistor 78 is of any desired variable resistance type and is arranged for manual control to vary the voltage applied to the control windings 60e, 61e and 62e. Since the energization of the control windings 60e, 61e and 62e does not vary except in response to manual control of the resistor 78, these windings may be called reference windings or reference fields for the machines 60, 61 and 62.

The control field windings 60d, 61d and 62d are the basic control windings on the machines in that it is these windings which provide flux to enable the machines to build up normal voltage. Hence, the windings 60d, 61d and 62d determine the polarity of the machines 60, 61 and 62. In motoring operation the fluxes of these basic control windings are in the same direction as and aid the fluxes of their respective reference windings 60e, 61e and 62e.

In order to give the traction motors 10 to 21, inclusive, a predominantly series operating characteristic, the control windings 60d, 61d and 62d of the exciting generators 60, 61 and 62 are energized in accordance with the magnitude of the current flowing in the armature circuits of the associated traction motors. Specifically, the control field 60d of the machine 60 is connected across the terminals of an inductive resistor 80 connected in series circuit relation with the motor armatures 14 and 15, the field windings 20 and 21 of which are energized by the exciter 60. Thus, the energization of the field windings 20 and 21 is proportionate to the motor current flowing through the armatures 14 and 15 as reflected in the voltage drop across the control resistor 80 and amplified by the direct current exciter 60. In like manner inductive resistors 81 and 82 are connected in series circuit relation with the armatures 12, 13 and 10, 11, respectively, to supply voltage drops for energizing the control windings 61d and 62d, respectively, of the machines 61 and 62, respectively. The control windings 60d, 61d and 62d are each connected to their respective inductive resistors through manually operable variable resistors 85, 86 and 87, respectively, and reversing switches which have been diagrammatically illustrated at Fig. 1 as a single reverser 83. In normal motoring operation the fluxes of the control windings 60d, 61d and 62d aid the fluxes of the reference windings 60e, 61e and 62e, respectively, and preferably predominate in magnitude.

While I have shown the windings 60d, 61d and 62d connected across separate inductive resistors 80, 81 and 82, respectively, it will be readily understood by those skilled in the art that it is not necessary in all cases to provide separate resistors for supplying voltage drop to energize the control windings of the dynamo-electric amplifiers, but that, if desired, the control windings may be connected across the commutating or compensating field windings or both of the associated traction motors. Since the commutating and compensating field windings of the traction motors are inductive certain advantages hereinafter explained are retained, but it will also be understood that in its more fundamental aspects the invention does not necessarily contemplate the use of an inductive resistance to obtain a voltage drop. If desired, the voltage drop used to energize the current responsive control windings of the dynamo-electric amplifier may be a substantially pure IR drop taken across the terminals of a substantially non-inductive resistor.

With the foregoing understanding of the elements and their organization in the control system the operation of the system as a whole will be readily understood from the following brief description.

When the traction motors are at a standstill with the resistance of the accelerating and braking resistors 26a, 26b and 26c at their maximum, the traction motor field windings 16 to 21, inclusive, are initially energized by applying energization to the reference field windings 60e, 61e and 62e of the armature reaction exciters 60, 61 and 62. The field flux set up by the reference field windings 60e, 61e and 62e causes the voltage of the machines 60, 61 and 62 to build up in the desired direction and send a current through the traction motor field windings. This current is the load current of the exciters 60, 61 and 62 and energizes the load compensating field windings 60f, 61f and 62f of the exciters. With the traction motor field windings 16 to 21, inclusive, energized, the line circuit breaker 25 may be closed to initiate acceleration of the traction motor armatures 10 to 15, inclusive. Closing of the line breaker 25 causes a current to flow through the traction motor armatures and this flow of current produces voltage drop across the inductive resistors 80 to 82, inclusive.

The voltage drops across the resistors 80 to 82, inclusive, cause current to flow in the control windings 60d, 61d and 62d of the machines 60, 61 and 62. It will be evident that the magnitude of the current flowing in the control windings 60d, 61d and 62d is directly proportional to the magnitude of current flowing in the associated traction motor armatures. Since the energization of the reference field windings 60e, 61e and 62e of the machines 60, 61 and 62 is ordinarily maintained substantially constant during motoring operation except for weak field high speed running and since the current responsive field windings 60d, 61d and 62d aid the reference windings and supply the major portion of the flux, the energization of the machines 60, 61 and 62 will be varied in accordance with the armature currents of the associated traction motors superimposed upon a substantially constant excitation provided by the reference control windings 60e, 61e and 62e. Hence, the traction motor field windings will be energized in the manner of a cumulatively compounded motor with a predominantly series characteristic. It will thus be evident that with the control field windings 60d, 61d and 62d connected in accordance with my invention, the separately excited traction motors will be possessed of predominantly series motor operating characteristics.

To accelerate the motors the resistance of the accelerating and braking resistors 26a, 26b and 26c is gradually diminished in a manner well known to those skilled in the art. During this period and under all operating conditions the motors act as cumulatively compound wound motors with a predominant series characteristic due to the manner of energization of the control field windings 60d, 61d and 62d of the exciters 60, 61 and 62. As mentioned hereinbefore, the resistors 80, 81 and 82 are preferably inductive. This characteristic has no effect upon the control field 60d, 61d and 62d under constant current conditions but under rapidly changing load conditions or other changing current conditions, such as in regenerative braking or accelerating operations, the inductive voltages appearing across the resistors 80, 81 and 82 are immediately applied to the control fields 60d, 61d and 62d, respectively, before the current through the resistors changes substantially, thereby providing a more rapid response of the exciter generators 60, 61 and 62 in accordance with changing currents in the traction motor armatures.

When the accelerating resistors 26a, 26b and 26c have been completely short circuited and a higher vehicle running speed is desired, underexcitation of the traction motor field windings 16 to 21, inclusive, is accomplished by manipulation of the excitation of the reference field windings 60e, 61e and 62e to produce the same result as is obtained by conventional motor field shunting well known to those skilled in the art. Since the current responsive control field windings 60d, 61d and 62d aid the reference field windings 60e, 61e and 62e during motoring operation, field weakening of the traction motors may be accomplished by decreasing the energization of the reference field windings 60e, 61e and 62e in response to an increase in the resistance of the control resistor 78. In the event that the change in the energization of the reference field windings 60e, 61e and 62e which may be obtained by manipulation of the control resistor 78 is not sufficient the reverser 79 may be operated to cause the reference fields to buck down the flux of the current responsive control fields.

To reverse the traction motors the polarity of the armature reaction direct current exciting machines 60, 61 and 62 is reversed. This reversal of polarity is accomplished by reversing the polarity of all the reference control windings through the reverser 79 and reversing the polarity of all the current responsive control windings through the reverser 83.

If it is desired to apply regenerative braking, over-excitation of the traction motor field windings 16 to 21, inclusive, may be obtained by simply decreasing the resistance of the control resistor 78 thereby to increase the current flow in the reference windings 60e, 61e and 62e and increase the output of the exciters 60, 61 and 62. As soon as regeneration begins the automatic reversal of current in the traction motor armatures will produce an automatic reversal of the energization of the current responsive control field windings 60d, 61d and 62d. By such reversal the current responsive control fields produce a flux in bucking relation to the flux of the reference fields 60e, 61e and 62e and thus tend to reduce the excitation of the armature reaction exciters 60, 61 and 62 and unload the traction motors. To overcome this effect it is necessary to reduce the energization of the control field windings 60d, 61d and 62d and to increase the excitation of the reference field windings 60e, 61e and 62e so that the flux of the reference field windings predominates during regenerative braking and supplies a net control flux for each exciting machine which is larger than the combined control flux of the reference field and current responsive control field during motoring operation at the same vehicle speed. It is for this purpose that I provide the resistors 85, 86 and 87 in series circuit relation with the control windings 60d, 61d and 62d, respectively. It will be understood that if desired the resistors 85, 86 and 87 may be fixed rather than variable and may be arranged for automatic or manual insertion in their respective circuits upon transfer of the motors to regenerative braking operation.

To supplement the regenerative braking, dynamic braking is provided for retarding the vehicle at low speeds. The traction motors may be transferred from regenerative braking to dynamic braking by simply opening the line circuit breaker 25 and the switches 31, 33 and 35 and closing the switches 50, 51 and 52 thereby to connect each series connected pair of traction motor armatures in a closed loop circuit including the associated accelerating and braking resistor. No change is necessary in the field circuit connections. It is to be noted that with the connections shown the exciter field windings 60d, 61d and 62d are not energized during dynamic braking, since no current flows through the resistors 80, 81 and 82. As is well understood by those skilled in the art, dynamic braking may be continued to a relatively low vehicle speed by gradually short circuiting the accelerating and braking resistors as vehicle speed decreases. The dynamic braking rate may also be controlled by manipulation of the field resistor 78.

Attention has been directed to the fact that in regenerative braking operation the energization of the control field windings 60d, 61d and 62d is automatically reversed in response to a reversal of direction of the traction motor armature current. As previously noted, the control fields 60d, 61d and 62d are in bucking relation to the reference fields 60e, 61e and 62e during regenerative braking operation. With the armature reaction exciter control fields in bucking relation during regenerative braking there will exist a favorable stabilizing effect upon the motors when acting as generators. For example, if a voltage dip occurs on the line during regeneration a sudden increase in regenerative current will result and this sudden increase in regenerative current will cause an increase in the excitation of the windings 60d, 61d and 62d with a consequent decrease in the voltage of the dynamo-electric amplifying generators 60, 61 and 62. The decreased voltage of the exciting generators 60, 61 and 62 will reduce the field excitation of the traction motors and reduce the regenerated voltage. Similarly, an increase in line voltage will result in an increase in regenerated voltage. This stabilizing effect will tend to maintain a constant armature current during regenerative braking operation. In regenerative braking it is desirable to reduce the energization of the control fields 60d, 61d and 62d by means of the resistors 85, 86 and 87 until the bucking fluxes of these fields are only sufficient to insure stability of the traction motors.

While I have described and illustrated a preferred embodiment of my invention by way of illustration, many further modifications will occur to those skilled in the art, and I therefore wish to have it understood that I intend by the appended claims to cover all such modifications as fall within the true spirit and scope of my invention.

What I claim as new and desire to secure by Letters Patent of the United States, is:

1. An electric traction motor control system comprising a direct current driving motor having an armature and a field winding, means for connecting said armature to a source of electric current supply, a dynamo-electric amplifier for supplying excitation current to said field winding, a first control field winding for said dynamo-electric amplifier energized from a substantially constant voltage supply source, manually operable means for controlling the energization of said control field winding, a second control field winding for said dynamo-electric amplifier arranged to modify the effect of said first control field winding, means for energizing said second control field winding in accordance with the current flowing in said armature thereby to control the output of said dynamo-electric amplifier and the energization of said field winding in accordance with said current, means for increasing the energization of said first control field winding to establish regenerative braking operation, and means for substantially disabling said second control field winding during said braking operation.

2. An electric traction motor control system comprising a direct current driving motor having an armature and a field winding, means for connecting said armature to a source of electric current supply, a dynamo-electric amplifier for supplying excitation current to said field winding, a control field winding for said dynamo-electric amplifier energized from a substantially constant voltage supply source, manually operable means for controlling the energization of said control field winding, a second control field winding for modifying the effect of said first control field winding, means for energizing said second control field winding in accordance with the value of current flowing in said armature, and independently operable reversing means for each of said control field windings.

3. An electric traction motor control system comprising a direct current driving motor having an armature and a field winding, means for connecting said armature to a source of electric current supply, a dynamo-electric amplifier for supplying excitation current to said field winding, a first control field winding for said dynamo-electric amplifier energized from a substantially constant voltage supply source, a second control field winding for said dynamo-electric amplifier, means for energizing said second control field winding in accordance with the direction and magnitude of current in said armature, and manually operable means for increasing the energization of said first control field winding and decreasing the energization of said second control field winding thereby to overexcite said driving motor and to establish regenerative braking operation thereof.

4. An electric traction motor control system comprising a direct current driving motor having an armature and a field winding, means for connecting said armature to a source of electric current supply, a dynamo-electric amplifier for supplying excitation current to said field winding, a control field winding for said dynamo-electric amplifier energized from a substantially constant voltage source of supply, manually operable means for controlling the energization of said control field winding, a second control field winding for said dynamo-electric amplifier operable in conjunction with said first control field winding to modify the effect thereof, means for energizing said second control field winding in accordance with the direction and magnitude of current in said armature, the energization of said second control field winding during motoring operation of said motor being cumulative with respect to the energization of said first control field winding, and means for decreasing the energization of said second control field winding during regenerative braking operation of said traction motor.

5. An electric traction motor control system comprising a direct current driving motor having an armature and a field winding, means for connecting said armature to a source of electric current supply, a dynamo-electric amplifier for supplying excitation current to said field winding, a first control field winding for said dynamo-electric amplifier, a substantially constant voltage source of direct current supply for energizing said control field winding, manually operable control means for controlling the energization of said control field winding, a second control field winding for said dynamo-electric amplifier, variable voltage means responsive to the direction and magnitude of current in said armature for energizing said second control field winding cumulatively with respect to said first control field winding during motoring operation of said driving motor and to a degree varying substantially directly with the magnitude of current in said armature, said second control field winding being energized differentially with respect to said first control field winding during regenerative braking operation, and means for reducing the energization of said second control field winding during regenerative braking operation to ensure predominance of said first control field winding.

6. An electric traction motor control system comprising a direct current driving motor having an armature and a field winding, means for connecting said armature to a source of electric current supply, a dynamo-electric amplifier for supplying excitation current to said field winding, substantially constant speed driving means for said dynamo-electric amplifier, a control field winding for said dynamo-electric amplifier energized from a substantially constant voltage source of supply, a second control field winding for said dynamo-electric amplifier, means responsive to the current in said armature for energizing said second control field winding in accordance with said current and cumulatively with respect to said first control field winding during motoring operation of said driving motor thereby to vary the output of said amplifier in such a manner as to impart to said motor a predominantly series operating characteristic, and manually operable control means for controlling independently the energization of each of said control field windings to provide for reduced field running motoring and electric braking operation of said driving motor.

7. An electric traction motor control system comprising a direct current driving motor having an armature and a field winding, means for connecting said armature to a source of electric current supply, a dynamo-electric amplifier for supplying excitation current to said field winding, substantially constant speed driving means for said dynamo-electric amplifier, a first control field winding for said dynamo-electric amplifier a substantially constant voltage source of direct current supply for energizing said first control field winding, a second control field winding for said dynamo-electric amplifier arranged to modify the effect of said first control field winding, means responsive to the current in said armature for energizing said second control field winding in accordance with the value of said current and cumulatively with respect to said first control field winding during motoring operation of said driving motor, reversing means independently operable to control the direction of energization of each of said control field windings, and manually operable control means for varying independently the degree of energization of said control field windings.

8. An electric traction motor control system comprising a direct current driving motor having an armature and a field winding, means for connecting said armature to a source of electric current supply, a dynamo-electric amplifier for supplying excitation current to said field winding, a control field winding for said dynamo-electric amplifier energized from a substantially constant voltage supply source, manually operable means for controlling the energization of said control field winding, a second control field winding arranged to modify the effect of said first control field winding, and an inductive resistor connected in series circuit relation with said armature and across the terminals of said second control field windings to provide a voltage drop for energizing said second control field winding in accordance with the current in said armature.

9. An electric traction motor control system comprising a direct driving motor having an armature and a field winding, means for connecting said armature to a source of electric current supply, a dynamo-electric amplifier for supplying excitation current to said field winding, a control field winding for said dynamo-electric amplifier energized from a substantially constant voltage supply source, manually operable means for controlling the energization of said control field winding, a second control field winding for said dynamo-electric amplifier arranged to modify the effect of said first control field winding, means for energizing said second control field winding in accordance with the current flowing in said armature during motoring and regenerative braking operation of said driving motor, said last-named means being arranged to effect an automatic reversal of energization of said second control field winding upon a transfer from motoring to regenerative braking operation, means for decreasing the energization of said second control field winding during regenerative braking operation of said driving motor, and means for disabling said second control field winding during dynamic braking operation of said driving motor.

THOMAS F. PERKINSON.